Aug. 15, 1961 P. A. MAUCH 2,996,349
NRZ RECORDING CIRCUITRY
Filed Nov. 29, 1957
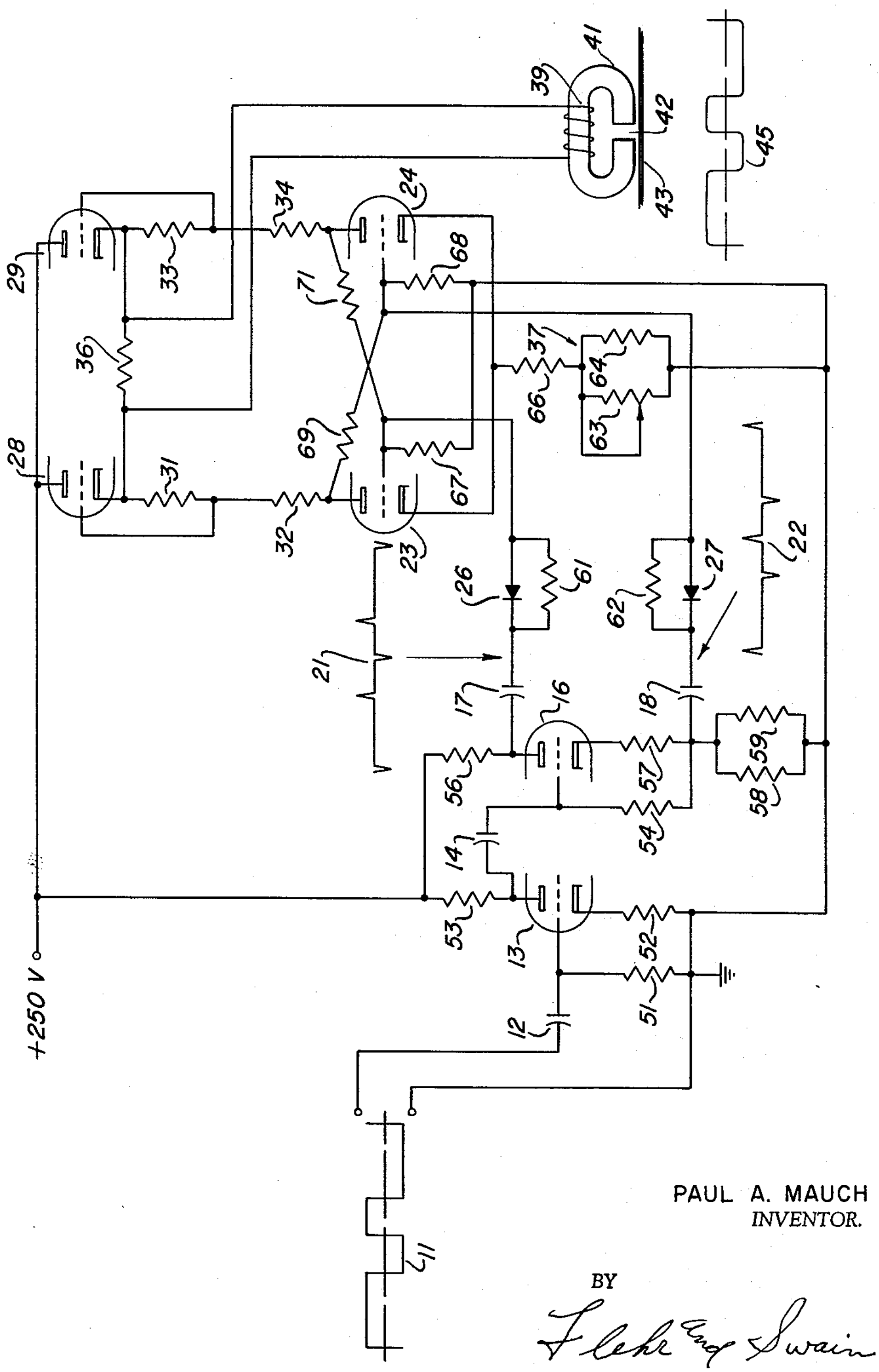
PAUL A. MAUCH
INVENTOR.
BY
Fleke & Swain 2,996,349
Patented Aug. 15, 1961

2,996,349

NRZ RECORDING CIRCUITRY

Paul A. Mauch, Mountain View, Calif., assignor to Ampex Corporation, Redwood City, Calif., a corporation of California Filed Nov. 29, 1957, Ser. No. 699,562
5 Claims. (Cl. 346—74)

This invention relates generally to a magnetic recording apparatus and more particularly to magnetic recording apparatus suitable for recording digital information.

In the prior art several methods have been employed for recording digital information on a magnetic recording medium. A list of these methods is as follows: (1) The pulse or dipole method; (2) Telegraph or non-return-to-zero method; (3) The phase modulation method; and (4) The frequency modulation method.

It is an object of this invention to provide an improved circuit for energizing the magnetic recording head in the non-return-to-zero method of recording digital information.

It is another object of the present invention to provide a recording apparatus in which a bistable bridge circuit serves to excite the magnetic head for recording digital information by the non-return-to-zero method.

It is another object of the present invention to provide a recording apparatus in which a recording head is connected directly across two terminals of a bistable bridge circuit.

These and other objects of the invention will become more clearly apparent from the following description when taken in conjunction with the accompanying drawing.

The circuit is in the form of a bridge circuit having four legs connected to form four bridge terminals. An adjacent pair of the legs is connected to form a bistable circuit in which one of the legs is conducting and the other non-conducting. The other adjacent pair of legs is so connected that each becomes conducting when the opposite leg of the bistable circuit becomes conducting. A voltage supply is connected between the common terminal of each pair of legs. The magnetic recording head is connected across the other pair of terminals.

Referring to the drawing, input digital information 11 is differentiated by the combination of capacitor 12 and resistor 51 and applied to the grid of the tube 13 which is connected to function as an amplifier. The amplified pulses are capacitively coupled 14 to the grid of the tube 16 which is connected to act as a split phase inverter supplying output pulses of opposite polarity at its plate and cathode each time there is a change in the digital information 11. The output pulses are capacitively coupled 17 and 18 to an associated bistable bridge circuit to be presently described.

The pulses are schematically represented at 21 and 22. A pair of triggering spikes are formed each time the input digital information 11 is applied to the bistable circuit. The spikes of each of the waveforms 21 and 22 are of opposite polarity, the first spike occurring at the leading edge of the input pulse 11; and the second spike at the trailing edge of the pulse 11.

The waveforms 21 and 22 are applied to the grids of the tubes 23 and 24 connected in a conventional manner to form a bistable circuit. The bistable circuit is of the Eccles-Jordan type in which for each stable condition one of the tubes is highly conducting and the other tube is cut off. When a positive triggering pulse is applied to the non-conducting tube, it serves to instantaneously make the tube conducting. The drop in plate voltage is transmitted to the grid of the other of the pair of tubes and serves to cause the other tube to be cut off. Alternately, negative pulses may be applied to the conducting tube to cut off the same. In either event, the system jumps almost instantaneously from one stable condition to the other resulting in what is commonly termed a trigger, flip-flop or bistable characteristic.

The pair of diodes 26 and 27 serves to assure that only positive going pulses are transmitted to the grid of the associated bistable tube.

A plate supply voltage is applied to the bistable tubes through the tubes 28 and 29. Series resistors 31 and 32 are connected between the plate of the tube 23 and the cathode of the tube 28. Serially connected resistors 33 and 34 are connected between the plate of the tube 24 and the cathode of the tube 29. The grid of the tube 28 is connected to the common junction of the resistors 31 and 32 and the grid of the tube 29 is connected to the common junction of the resistors 33 and 34.

Assuming, for example, that the tube 23 is conducting, its plate voltage is near ground potential. The grid of the tube 28 will be at a potential less than that of the cathode thereby biasing the tube non-conducting. However, for this condition the tube 24 is non-conducting and the plate voltage of the tube is relatively high. Since no current is flowing through this tube, the grid of the tube 29 will be assentially at cathode potential and this tube is biased in its conducting condition. In this state there is a relatively low impedance path through the tube 29 which forms one leg of a bridge circuit, and resistors 31, 32, the tube 23 which forms another leg of a bridge circuit through resistive network 37 to ground. The coil 39 of the magnetic head 41 is connected in shunt with the resistor 36 which is connected between the cathode of the tubes 28 and 29. Depending upon the relative impedance of the resistor and head, a predetermined portion of the current flowing in the low impedance path will flow through the coil 39 and serve to create a magnetic field at the recording gap 42. The ratio of impedances between the resistor 36 and coil 39 is so selected that the field set up in the gap 42 is sufficient to saturate the magnetic tape 43 in one direction.

When the digital information 11 changes, the bistable circuit is shifted to its other stable condition, that is with the tube 24 conducting and the tube 23 not conducting. The tube 28 becomes conducting thereby forming a current path through tube 28 which forms another leg of a bridge circuit through resistors 33, 34, tube 24 which forms another leg of a bridge circuit and through the cathode resistive network 37 to ground. The current through the magnetic head is reversed again creating a flux at the recording gap 42; however, the flux if of opposite direction serves to saturate the magnetic tape in an opposite direction. The current through the head for the digital information 11 is shown at 45.

Although reference has been made to magnetic tape as the recording medium, it is apparent that other types of recording mediums may be employed. For example, disc type magnetic records an the like may be employed. Conventional means are suitable for driving the recording medium past the gap 42 of the recording head.

Apparatus was constructed in accordance with the foregoing in which:

Voltage +V=+250V

Tubes 13 and 16 were known by manufacture's spec. as 12AU7.

Tubes 23 and 24 were known by manufacturer's spec. as 5965.

Tubes 28 and 29 were known by manufacturer's spec. as 5965.

The resistors had the following values:

| | | |
|---|---|---|
| **31** | ohms | 470 |
| **32** | do | 2700 |
| **33** | do | 470 |
| **34** | do | 2700 |
| **36** | do | 1500 |
| **51** | do | 47K |
| **52** | do | 2200 |
| **53** | do | 47K |
| **54** | do | 100K |
| **56** | do | 47K |
| **57** | do | 3300 |
| **58** | do | 68K |
| **59** | do | 100K |
| **61** | megohms | 2.7 |
| **62** | do | 2.7 |
| **63** | ohms | 0–2000 |
| **64** | do | 1800 |
| **66** | do | 1500 |
| **67** | do | 100K |
| **68** | do | 100K |
| **69** | do | 470K |
| **71** | do | 470K |

The capacitors had the following values:

| | Microfarads |
|---|---|
| **12** | .00015 |
| **14** | .001 |
| **17** | .001 |
| **18** | .001 |

Apparatus constructed in accordance with the foregoing was employed to record digital information and served to saturate the magnetic tape in opposite direction without returning to zero saturation.

Thus, it is seen that there is provided a novel bridge circuit for energizing a magnetic head to record digital information by the non-return-to-zero method. The circuit serves to provide energization to the head of sufficient magnitude that the associated magnetic medium is saturated in either direction. The bridge circuit further provides means whereby the head is energized in such a manner that the magnetization of the magnetic medium never returns to zero.

I claim:

1. Magnetic recording apparatus comprising a recording head having a coil, a bridge circuit having first and second connected pairs of legs, each pair of legs having a common terminal, the first pair of legs having means included in each leg for providing conduction in one leg and non-conduction in the other leg alternately, the second pair of legs having means included in each leg for providing conduction in one leg and non-conduction in the other leg alternately in an opposite alternate sense with respect to that of the first pair of legs, voltage supply means connected between the common terminal of each of said pairs of legs, said recording coil being connected between junctions of said first and second pairs of legs, and split phase inverter means coupled between a source of input pulses and the means of each of the legs of said first pair of legs for controlling the direction of current flow through said recording coil in response to said input pulses.

2. Magnetic recording apparatus comprising a recording head having a coil, a bridge circuit having first and second connected pairs of legs, each pair of legs having a common terminal, each leg of the first pair of legs having a vacuum tube including at least plate, grid and cathode elements, the vacum tubes of said first pair of legs being interconnected to provide conduction in one leg and nonconduction in the other leg alternately, the second pair of legs having devices connected to provide respective conduction and nonconduction in an opposite alternate sense with respect to the vacuum tubes of the first pair of legs, said recording coil being connected between junctions of the first and second pairs of legs, voltage supply means connected between the common terminal of each of said pairs of legs, and split phase inverter means coupled between a source of input pulses and the respective grids of the vacuum tubes for controlling the direction of current flow through the recording coil in response to input pulses.

3. Magnetic recording apparatus comprising a recording head having a coil, a bridge circuit having first and second connected pairs of legs, each pair of legs having a common terminal, each leg of the first pair of legs having a vacuum tube including at least plate, grid and cathode elements, the vacuum tubes of said first pair of legs being interconnected to provide conduction in one leg and nonconduction in the other leg alternately, each leg of the second pair of legs having a vacuum tube including at least plate, grid and cathode elements, the vacuum tubes of said second pair of legs being connected to provide conduction in one leg and non-conduction in the other leg in an opposite alternate sense with respect to the vacuum tubes of said first pair of legs, said recording coil being connected between junctions of the first and second pairs of legs, voltage supply means connected between the common terminal of each of said pairs of legs, and split phase inverter means coupled between a source of input pulses and the respective grids of the vacum tubes of said first pair of legs for controlling the direction of current flow through the recording coil in response to input pulses.

4. Magnetic recording apparatus comprising a recording head having a coil, a bridge circuit having first and second connected pairs of legs, each pair of legs having a common terminal, each leg of the first pair of legs having a vacuum tube including at least plate, grid and cathode elements, the vacuum tubes of said first pair of legs being interconnected to provide conduction in one leg and nonconduction in the other leg alternately, each leg of the second pair of legs having a vacuum tube including at least plate, grid and cathode elements, the vacuum tubes of said second pair of lugs being connected to provide conduction in one leg and non-conduction in the other leg in an opposite alternate sense with respect to the vacuum tubes of said first pair of legs, said recording coil being connected between junctions of the first and second pairs of legs, voltage supply means connected between the common terminal of each of said pairs of legs, amplifying means for receiving and amplifying input pulses, and a split phase inverter for receiving the output of said amplifying means and for applying the same to the respective grids of the vacuum tubes of said first pair of legs to control the direction of current flow through the recording coil in response to input pulses.

5. Magnetic recording apparatus comprising first and second vacuum tubes, each having at least plate, grid, and cathode elements, the first and second tubes being interconnected to provide a flip-flop circuit, a third vacuum tube having at least plate, grid, and cathode elements, a first pair of series-connected resistors extended from the plate of the first tube to the cathode of the third tube with the grid of the third tube connected to the common point between the first pair of resistors, a fourth vacuum tube having at least plate, grid, and cathode elements, a second pair of series-connected resistors extended from the plate of the second tube to the cathode of the third tube with the grid of the fourth tube connected to the common point between the second pair of resistors, means for supplying operating voltages to the first to fourth tubes, a magnetic recording head having a coil coupled between the respective cathodes of the third and fourth tubes, and a split phase inverter coupled to the respective grids of the first and second tubes for applying input pulses to control the direction of current flow through the coil in response to the input pulses.

References Cited in the file of this patent

UNITED STATES PATENTS

| | | |
|---|---|---|
| 2,633,402 | Fleming | Mar. 31, 1953 |
| 2,684,468 | McClure et al. | July 20, 1954 |
| 2,719,964 | McGuigan et al. | Oct. 4, 1955 |
| 2,797,320 | Beaufoy | June 25, 1957 |
| 2,815,498 | Steele | Dec. 3, 1957 |
| 2,824,776 | Elovic et al. | Feb. 25, 1958 |
| 2,838,675 | Wanlass | June 10, 1958 |
| 2,844,723 | Jameson | July 22, 1958 |
| 2,907,895 | Van Overbeck | Oct. 6, 1959 |
| 2,928,011 | Campbell | Mar. 8, 1960 |